(12) United States Patent
Kakishima et al.

(10) Patent No.: US 10,804,990 B2
(45) Date of Patent: Oct. 13, 2020

(54) BASE STATION AND USER EQUIPMENT

(71) Applicant: NTT DOCOMO, INC., Tokyo (JP)

(72) Inventors: Yuichi Kakishima, Tokyo (JP); Satoshi Nagata, Tokyo (JP); Chongning Na, Beijing (CN); Xiaolin Hou, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/507,771

(22) PCT Filed: Sep. 15, 2015

(86) PCT No.: PCT/JP2015/076172
§ 371 (c)(1),
(2) Date: Mar. 1, 2017

(87) PCT Pub. No.: WO2016/047505
PCT Pub. Date: Mar. 31, 2016

(65) Prior Publication Data
US 2017/0288758 A1    Oct. 5, 2017

(30) Foreign Application Priority Data
Sep. 25, 2014 (JP) .................. 2014-195882

(51) Int. Cl.
*H04B 7/06* (2006.01)
*H04B 7/10* (2017.01)
(Continued)

(52) U.S. Cl.
CPC ............. *H04B 7/0626* (2013.01); *H04B 7/04* (2013.01); *H04B 7/0478* (2013.01);
(Continued)

(58) Field of Classification Search
CPC .......... H04B 7/02; H04B 7/04; H04B 7/0404; H04B 7/0408; H04B 7/0413;
(Continued)

(56) References Cited

U.S. PATENT DOCUMENTS

| 9,397,738 B2 * | 7/2016 | Xu ........................ H04B 7/0417 |
| 2003/0092402 A1 * | 5/2003 | Shapira ................ H04B 7/0615 455/101 |

(Continued)

FOREIGN PATENT DOCUMENTS

JP    2014-053811 A    3/2014

OTHER PUBLICATIONS

Office Action dated Mar. 28, 2017, issued by the Japan Patent Office in corresponding Japanese Patent Application No. JP 2016-550120, with English translation (4 pages).
(Continued)

*Primary Examiner* — Young T Tse
(74) *Attorney, Agent, or Firm* — Osha Liang LLP (57) ABSTRACT

Some techniques for implementing estimation of channel states with high accuracy and efficient feedback of the channel states in 3D MIMO are disclosed. One aspect of the present invention relates to user equipment for implementing 3D MIMO (3-Dimensional Multiple-Input Multiple-Output) communication, comprising: a channel state information generation unit configured to measure channel states of antenna ports of 3D MIMO antennas in a base station with reference signals transmitted from the antenna ports and generate channel state information based on the measured channel states; and a channel state information feedback unit configured to use different channel state information feedback means for antenna ports in respective dimensions of the antennas to feed the generated channel state information back to the base station.

3 Claims, 8 Drawing Sheets

(51) Int. Cl.
  *H04L 5/00* (2006.01)
  *H04W 24/10* (2009.01)
  *H04B 7/04* (2017.01)
  *H04W 16/28* (2009.01)
  *H04B 7/0456* (2017.01)
  *H04W 72/04* (2009.01)

(52) U.S. Cl.
  CPC ............ *H04B 7/0617* (2013.01); *H04B 7/10* (2013.01); *H04L 5/0014* (2013.01); *H04W 16/28* (2013.01); *H04W 24/10* (2013.01); *H04B 7/0619* (2013.01); *H04B 7/0639* (2013.01); *H04L 5/0082* (2013.01); *H04W 72/0406* (2013.01)

(58) Field of Classification Search
  CPC .. H04B 7/0417; H04B 7/0478; H04B 7/0617; H04B 7/0619; H04B 7/0626; H04B 7/0628; H04B 7/0632; H04B 7/0639; H04B 7/08; H04B 7/0891; H04B 7/10; H04L 5/0014; H04L 5/0026; H04L 5/0082; H04W 16/28; H04W 24/10; H04W 72/0406
  USPC ............... 375/260, 262, 265, 267, 299, 347; 343/725, 729, 732, 777, 844; 455/500, 455/501, 63.1, 67.11, 67.13, 69, 70, 88
  See application file for complete search history.

(56) References Cited

U.S. PATENT DOCUMENTS

| | | | | |
|---|---|---|---|---|
| 2012/0176939 A1* | 7/2012 | Qu | .................. | H04L 5/0023 370/255 |
| 2013/0308714 A1 | 11/2013 | Xu et al. | | |
| 2013/0308715 A1 | 11/2013 | Nam et al. | | |
| 2013/0329664 A1 | 12/2013 | Kim et al. | | |
| 2014/0003240 A1* | 1/2014 | Chen | .................. | H04W 28/08 370/235 |
| 2014/0098689 A1 | 4/2014 | Lee et al. | | |
| 2014/0241274 A1* | 8/2014 | Lee | .................. | H04L 5/0048 370/329 |
| 2014/0247796 A1* | 9/2014 | Ouchi | .................. | H04L 5/0053 370/329 |
| 2015/0023280 A1* | 1/2015 | Kim | .................. | H04B 7/04 370/329 |
| 2015/0312905 A1* | 10/2015 | Seo | .................. | H04B 7/2656 370/280 |
| 2017/0163325 A1* | 6/2017 | Kang | .................. | H04B 7/0617 |

OTHER PUBLICATIONS

"Study on Downlink Enhancements for Elevation Beamforming for LTE", 3GPP TSG-RAN #57 RP-121183, 3GPP, Aug. 30, 2012 (Document of commonly known technique) (5 pages).
Alcatel-Lucent Shanghai Bell, Alcatel-Lucent, "Remaining aspects of CSI-RS parameters and signaling"; 3GPP TSG RAN WG1 Meeting #62bis, R1-105201, Xi'an, China, Oct. 5, 2010; Agenda Item: 6.3.1.1 (Document of commonly known technique) (3 pages).
Extended European Search Report issued in the counterpart European Patent Application No. 15843330.0, dated Aug. 24, 2017 (10 pages).
International Search Report issued in corresponding application No. PCT/JP2015/076172 dated Nov. 24, 2015 (4 pages).
Written Opinion of the International Searching Authority issued in corresponding application No. PCT/JP2015/076172 dated Nov. 24, 2015 (4 pages).
Qualcomm Incorporated, "Discussion on Simulation Assumptions for 3D Channel Model Calibration"; 3GPP TSG-RAN WG1 #74bis, R1-134621; Guangzhou, China; Oct. 7-11, 2013 (5 pages).
Fujitsu, "Discussion on Feedback Design for LTE-A"; 3GPP TSG RAN WG1 Meeting #61, R1-103221; Montreal, Canada; May 10-14, 2010 (4 pages).
3GPP TR 37.840 V12.1.0, "3rd Generation Partnership Project; Technical Specification Group Radio Access Network; Study of Radio Frequency (RF) and Electromagnetic Compatibility (EMC) requirements for Active Antenna Array System (AAS) base station (Release 12)"; Dec. 2013 (84 pages).
3GPP TS 36.213 V12.2.0, "3rd Generation Partnership Project; Technical Specification Group Radio Access Network; Evolved Universal Terrestrial Radio Access (E-UTRA); Physical layer procedures (Release 12)"; Jun. 2014 (207 pages).
Office Action issued in the counterpart Chinese Patent Application No. 201580050535.2, dated May 28, 2018 (14 pages).
Office Action issued in corresponding Chinese Patent Application No. 201580050535.2, dated Feb. 5, 2018 (17 pages).
Office Action issued in the counterpart European Patent Application No. 15843330.0, dated Feb. 19, 2019 (8 pages).
Office Action issued in counterpart European Patent Application No. 15843330.0, dated Jul. 19, 2019 (7 Pages).
Communication of the Applicant with entry into the examination and in response to C1 issued in counterpart European Patent Application No. 15843330.0, dated Dec. 12, 2017 (15 Pages).
Communication of the Applicant in response to C2 issued in counterpart European Patent Application No. 15843330.0, dated May 28, 2019 (7 Pages).
Extended European Search Report in counterpart European Application No. 20171818.6 dated Aug. 4, 2020 (10 pages).

\* cited by examiner

FIG. 1
(Prior Art)

(a) Elevation beam forming

• Up to 8-Tx (b) Full dimension-MIMO

• More than 8-Tx (e.g., 16, 32 and 64)

H_ap 8
V_ap 4
H_sf 1
V_sf 1
H_of 0
V_of 0
CPI 01

(b)

H_ap 8
V_ap 4
H_sf 2
V_sf 1
H_of 1
V_of 3
CPI 01

| Joint RI | H-rank | | | |
|---|---|---|---|---|
| | 1 | 2 | 3 | 4 |
| V-rank 1 | 0 | 1 | 2 | 3 |
| V-rank 2 | 4 | 5 | | |
| V-rank 3 | 6 | | | |
| V-rank 4 | 7 | | | |

BASE STATION AND USER EQUIPMENT

TECHNICAL FIELD

The present invention relates to a radio communication system.

BACKGROUND ART

Figure 1:
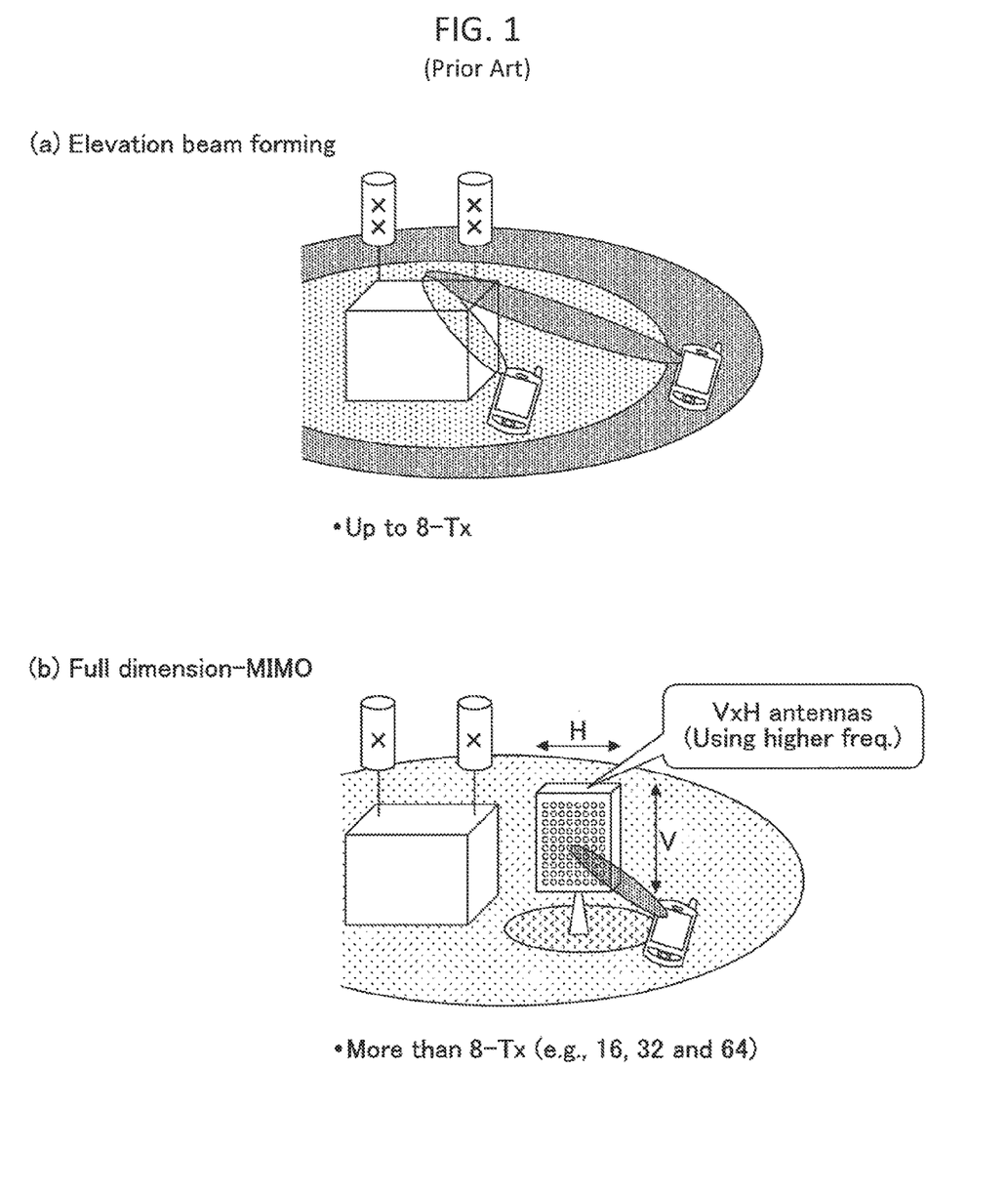
FIG. 1 is a schematic diagram for illustrating antenna types for 3D MIMO.

In addition to conventional horizontal beam control, 3D MIMO (Third Dimensional Multiple-Input Multiple-Output) for performing vertical beam control is being presently discussed. The 3D MIMO is sometimes classified into elevation beamforming (BF) and full dimension (FD)-MIMO depending on the number of antenna ports. As illustrated in FIG. 1, the 3D MIMO with up to eight antenna ports is referred to as the elevation beamforming, and the 3D MIMO with more antenna ports is referred to as the full dimension-MIMO or massive MIMO. In the full dimension-MIMO, as illustrated, not only two dimensional planar antennas having a large number of antenna ports but also three dimensional antennas, such as cylindrically arranged antennas and antennas arranged on surfaces of a cube, are used.

In the 3D MIMO where a base station having such multi-dimensional antennas controls beams in the two directions, that is, the horizontal direction and the vertical direction, active antenna system (AAS) based operations, where calibration is performed to form accurate beams in the vertical direction in consideration of impacts on inter-cell interference, are assumed. In Release 13 of LTE (Long Term Evolution) specifications, it is assumed that up to 64 transceiver units (TXRUs) are used, and these transceiver units are controlled under the active antenna system.

Figure 2:
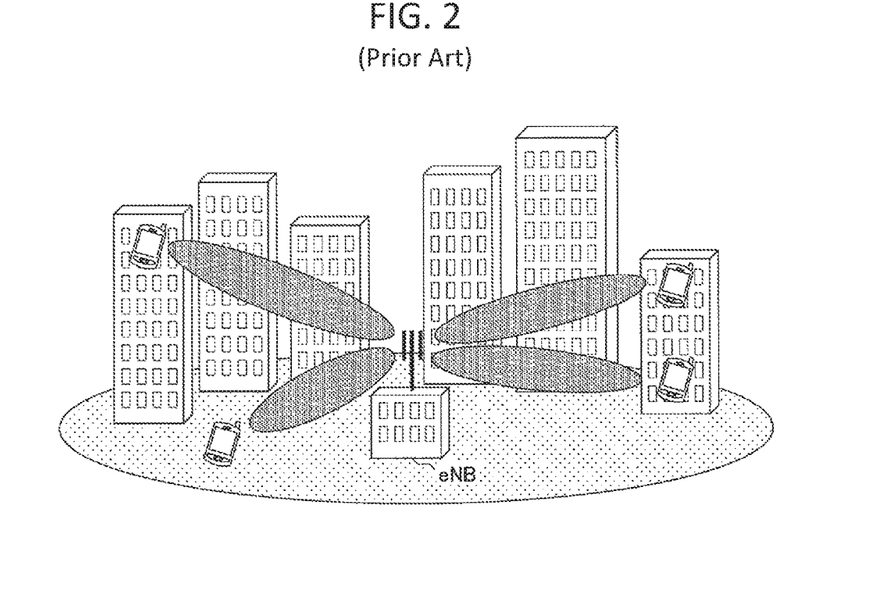
FIG. 2 is a schematic diagram for illustrating beam control in the 3D MIMO.

Effects of the 3D MIMO are as follows. First, a higher beam forming gain can be achieved by implementing the vertical beam control (precoding) in addition to the conventional horizontal direction. For example, as illustrated in FIG. 2, beams can be blown up toward user equipments in tall buildings. Also, the higher beam forming gain can be achieved with a larger number of antennas. For example, sharpened beams make it possible to transmit radio signals to targeted user equipment at higher transmission power as well as to reduce interference power from other beams. Furthermore, by using a huge amount of antenna elements, a transmission diversity gain can be achieved, and interference control and traffic offloading can be implemented with flexible beam control.

Figure 3:
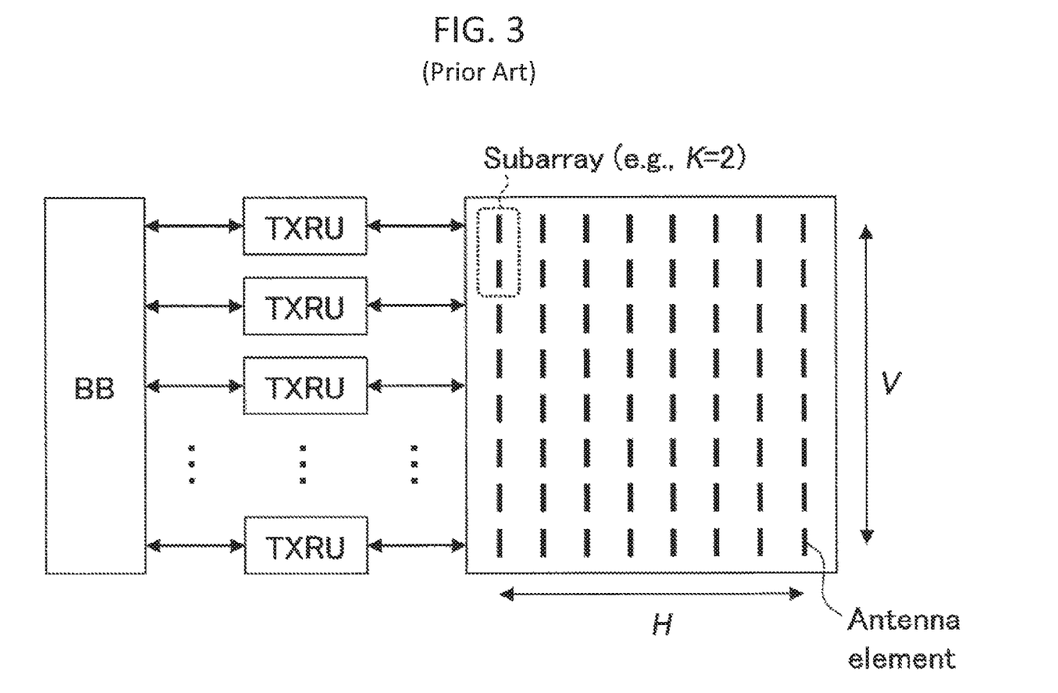
FIG. 3 is a schematic diagram for illustrating an exemplary 3D MIMO antenna arrangement.

Antennas for use in the 3D MIMO have an arrangement as illustrated in FIG. 3. Specifically, V×H antenna elements are grouped into multiple subarrays. The illustrated subarrays are composed of vertically arranged antenna elements, but are not limited to it, and may be composed of horizontally or two-dimensionally or three-dimensionally arranged antenna elements. Also, the subarrays may not be necessarily composed of successive antenna elements. In general, the number of subarrays is the same as the number of TXRUs but is not necessarily limited to it. In cases where a single subarray is composed of one antenna element (K=1), the best transmission characteristics can be achieved, but more TXRUs are needed, which may increase workload of an associated baseband (BB) processing unit. Here, fixed tilt may be sometimes applied to antenna elements in the subarrays. Also, in the illustrated 3D MIMO antennas, single polarization antennas are used, but are not limited to it, and orthogonal polarization antennas may be used.

In the full dimension-MIMO or the massive MIMO, beam tracking error has a significant impact due to sharpened beams, which may result in holes in coverage. For this reason, appropriate beam forming is important, and various beam forming schemes are discussed. In other words, in the 3D MIMO, it has to be defined how a base station transmits reference signals for channel state measurement from multiple antenna ports and how user equipment feeds the measured channel state back.

See 3GPP TR 37.840 V12.1.0 (2013-12) and 3GPP TS 36.213 V12.2.0 (2014-06) for further details, for example.

SUMMARY OF INVENTION

Problem to be Solved by the Invention

Figure 4:
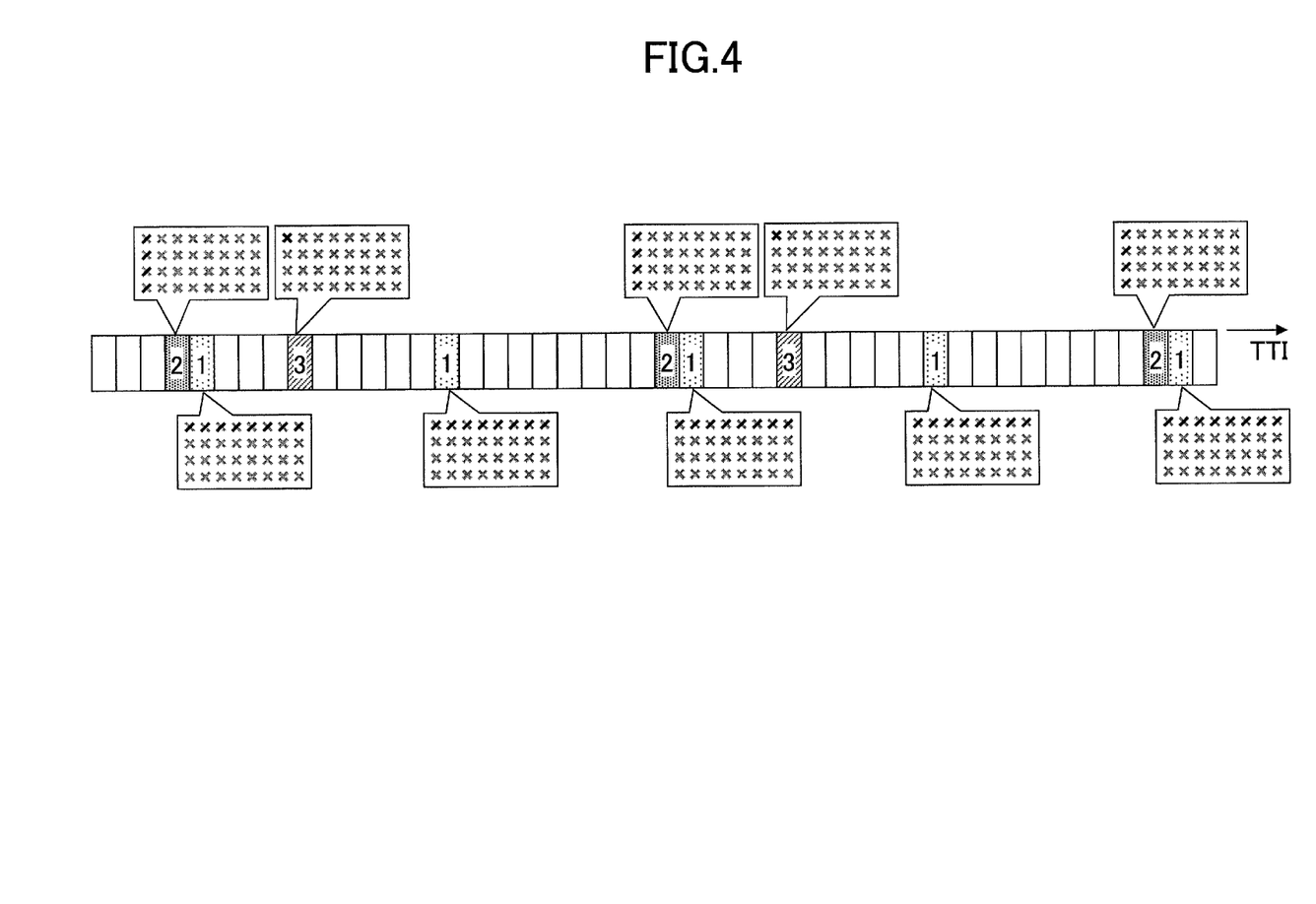
FIG. 4 is a schematic diagram for illustrating exemplary reference signal sequences.
Figure 5:
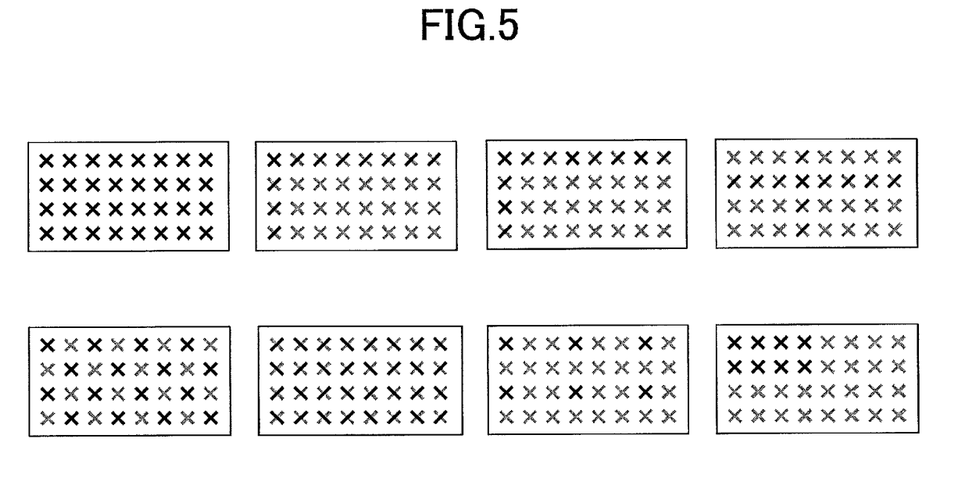
FIG. 5 is a schematic diagram for illustrating various transmission patterns of reference signals.

Specifically, the user equipment estimates the channel state for the reference signals transmitted from the respective antenna ports in the base station and feeds the estimated channel state as channel state information (CSI) back to the base station. In order to reduce overhead of the reference signals, a scheme for estimating horizontal channels, vertical channels and inter-polarization element channels by using several reference signal sequences is considered. For example, as illustrated in FIG. 4, the estimation using three patterns of CSI reference signals (CSI-RSs) is proposed. The horizontal CSI-RS, the vertical CSI-RS and the inter-polarization CSI-RS are indicated by configurations 1, 2 and 3, respectively and are transmitted at transmission timings as illustrated. Specifically, according to configuration 1, the CSI-RSs are transmitted from horizontal single polarization antennas at an indicated transmission timing. According to configuration 2, the CSI-RSs are transmitted from vertical single polarization antennas at an indicated transmission timing. According to configuration 3, the CSI-RSs are transmitted from orthogonal polarization antennas at an indicated transmission timing. However, the CSI-RS transmission patterns are not limited to them, and various transmission patterns as illustrated in FIG. 5 may be used. As illustrated in the transmission pattern in the upper left in FIG. 5, the reference signals may be transmitted from all antenna ports. However, overhead involved in that transmission and an amount of feedback from the user equipment may be significant. For this reason, other transmission patterns where reference signals are decimated, that is, where the reference signals are transmitted from sampled antenna ports, may be used as illustrated.

In the current specifications regarding antenna arrangements, a base station indicates only the total number of antenna ports such as the number of CRS (Cell specific Reference Signal) ports and the number of CSI-RS ports to user equipment. It can be considered that in order to implement accurate CSI feedback in the 3D MIMO, the user equipment can obtain detail information regarding on the antenna arrangement, estimate channel states for all antennas from CSI-RSs transmitted in various patterns based on interpolation using the detailed antenna arrangement or the like, and feed the estimated channel states back to the base station efficiently.

In light of the above-stated problems, an object of the present invention is to provide techniques for implementing accurate estimation of channel states and efficient feedback of the channel states in the 3D MIMO.

Means for Solving the Problem

In order to achieve the above object, one aspect of the present invention relates to a base station for implementing 3D MIMO (3-Dimensional Multiple-Input Multiple-Output) communication, comprising: 3D MIMO antennas; an antenna management unit configured to manage the antennas; and a transmission and reception unit configured to transmit and receive radio signals to/from user equipment via the antennas, wherein the antenna management unit has antenna configuration information indicative of an arrangement of the antennas, and the transmission and reception unit transmits the antenna configuration information to the user equipment.

Another aspect of the present invention relates to user equipment for implementing 3D MIMO (3-Dimensional Multiple-Input Multiple-Output) communication, comprising: a channel state information generation unit configured to measure channel states of antenna ports of 3D MIMO antennas in a base station with reference signals transmitted from the antenna ports and generate channel state information based on the measured channel states; and a channel state information feedback unit configured to use different channel state information feedback means for antenna ports in respective dimensions of the antennas to feed the generated channel state information back to the base station.

Advantage of the Invention

According to the present invention, accurate estimation of channel states and efficient feedback of the channel states in the 3D MIMO can be achieved.

EMBODIMENTS OF THE INVENTION

Embodiments of the present invention are described below with reference to the drawings.

In embodiments below, user equipment and a base station for implementing 3D MIMO communication are disclosed. Summarizing the present invention, a base station sends user equipment antenna configuration information indicative of an arrangement of 3D MIMO antennas such as two-dimensional planar antennas and reference signal configuration information indicative of a signaling pattern of reference signals such as a CSI-RS transmitted from respective antenna ports for channel state measurement and transmits the reference signals to the user equipment in the signaling pattern. The user equipment receives the reference signals transmitted from the base station in the indicated signaling pattern and uses different channel state information feedback means for the reference signals transmitted from the antenna ports in respective dimensions in the two-dimensional planar antennas to feed estimated channel state information to the base station. For example, for the reference signals from vertical antenna ports having relatively insignificant effects on transmission characteristics of beam control, the user equipment uses the relatively simple channel state information feedback means to feed back a precoding matrix indicator. On the other hand, for the reference signals from horizontal antenna ports having relatively significant transmission characteristics of beam control, the user equipment uses the channel state information feedback means capable of relatively fine precoding to feed back the precoding matrix indicator.

Figure 6:
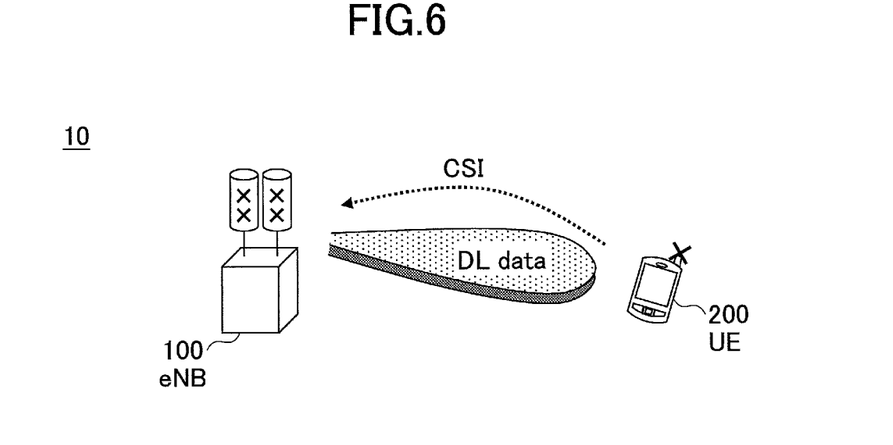
FIG. 6 is a schematic diagram for illustrating a radio communication system according to one embodiment of the present invention.

At the outset, a radio communication system according to one embodiment of the present invention is described. FIG. 6 is a schematic diagram for illustrating a radio communication system according to one embodiment of the present invention.

As illustrated in FIG. 6, the radio communication system 10 has a base station 100 and user equipment 200. The radio communication system 10 is an LTE system or an LTE-Advanced (LTE-A) system, but is not limited to it, and may be any radio communication system that supports 3D MIMO communication.

The base station 100 implements 3D MIMO communication with the user equipment 200 and wirelessly connects for the user equipment 200 via multiple antenna ports in incorporated multi-dimensional antennas such as two-dimensional antennas and three-dimensional antennas. Specifically, the base station 100 transmits downlink (DL) packets received from a network device such as an upper station and a server communicatively connected to a core network (not shown) to the user equipment 200 via multiple antenna ports and transmits uplink (UL) packets received from the user equipment 200 via the multiple antenna ports to the network device.

The base station 100 is typically composed of hardware resources such as 3D MIMO antennas for transmitting and receiving radio signals to/from the user equipment 200, communication interfaces for communicating with adjacent base stations 100 (for example, an X2 interface), communication interfaces for communicating with the core network (for example, an S1 interface) and a processor or circuit for processing transmission and reception signals with the user equipment 200. Functions and operations of the base station 100 as stated below may be implemented by the processor running data and/or programs stored in a memory device. However, the base station 100 is not limited to the above-stated hardware arrangement and may have any other appropriate hardware arrangement. In general, a large number of base stations 100 are disposed to cover a service area of the radio communication system 10.

The user equipment 200 implements the 3D MIMO communication with the base station 100 and transmits and receives radio signals such as various data signals and control signals to/from the base station 100 via multiple antenna ports of the base station 100. In order to implement appropriate 3D MIMO communication, the user equipment 200 estimates channel states with respective antenna ports and feeds the estimated channel states as channel state information (CSI) back to the base station 100. Upon receiving the channel state information, the base station 100 controls beams transmitted from the respective antenna ports based on the received channel state information.

The user equipment 200 may be typically any appropriate information processing device having a radio communication function such as a smartphone, a cellular phone, a tablet, a mobile router and a wearable terminal. The user equipment 200 is composed of a CPU (Central Processing Unit) such as a processor, a memory device such as a RAM (Random Access Memory) and a flash memory, a radio communication device for transmitting and receiving radio signals to/from the base station 100 and the like. For example, functions and operations of the user equipment 200 as stated below may be implemented by the CPU running data and/or programs stored in the memory device. However, the user equipment 200 is not limited to the above-stated hardware arrangement and may be composed of circuits for implementing one or more of the operations as stated below.

Figure 7:
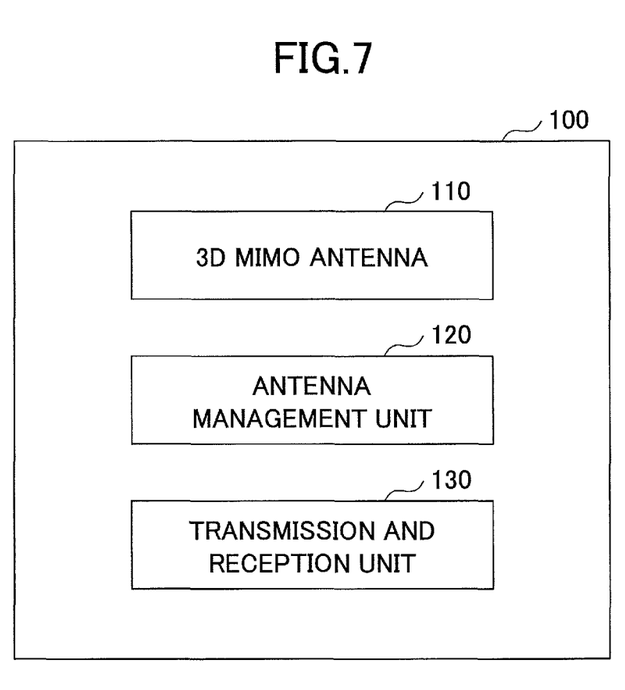
FIG. 7 is a block diagram for illustrating an arrangement of a base station according to one embodiment of the present invention.
Figure 8:
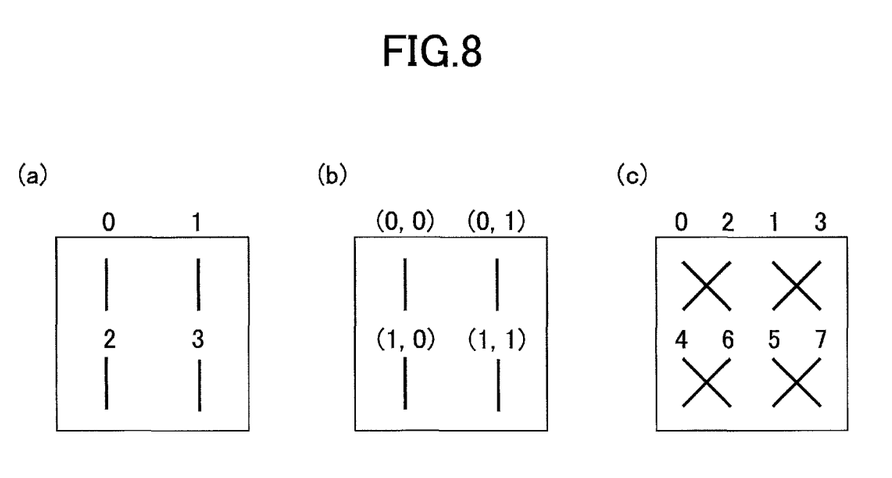
FIG. 8 is a diagram for illustrating an example of antenna port indexing according to one embodiment of the present invention.

Next, a base station according to one embodiment of the present invention is described with reference to FIGS. 7-9. FIG. 7 is a block diagram for illustrating an arrangement of the base station according to one embodiment of the present invention.

As illustrated in FIG. 7, the base station 100 has 3D MIMO antennas 110, an antenna management unit 120 and a transmission and reception unit 130.

The 3D MIMO antennas 110 are composed of multi-dimensional antennas arranged with multiple antenna elements such as two-dimensional planar antennas and three-dimensional antennas such as cylindrically arranged antennas and antennas arranged on cube surfaces. As illustrated in FIG. 3, the antennas 110 include antenna ports composed of one or more antenna elements, and beams transmitted from the respective antenna ports are controlled for 3D MIMO communication with the user equipment 200.

The antenna management unit 120 manages the antennas 110 and has antenna configuration information indicative of an arrangement of the antennas 110. In one embodiment, the antenna configuration information may indicate the number of antenna ports in each dimension of the antennas 110 and a polarization type of the antennas 110. For example, the antenna configuration information may indicate the number of vertical antenna ports (V_ap), the number of horizontal antenna ports (H_ap) and the polarization types of antenna ports indicative of single polarization or orthogonal polarization or the like (P_ap). However, the antenna configuration information is not limited to it and may relate to information indicative of an arrangement of antenna ports, an arrangement of antenna elements, an arrangement of TXRU, an antenna element interval or an arrangement of subarrays or any combination thereof, for example.

In one embodiment, the antenna management unit 110 may index antenna ports based on respective dimensions and polarization types of the antennas 110. FIG. 8 is a diagram for illustrating exemplary indexing of antenna ports according to one embodiment of the present invention. For example, if the antennas 110 are single polarization antennas, as illustrated in FIG. 8(a), the antenna ports may be first indexed with respect to the horizontal direction and then indexed with respect to the vertical direction. Similarly, the antenna ports may be first indexed with respect to the vertical direction and then indexed with respect to the horizontal direction, although not be shown. Also, as illustrated in FIG. 8(b), the antenna ports may be indexed with respect to the horizontal direction and the vertical direction independently. On the other hand, if the antennas 110 are orthogonal polarization antennas, as illustrated in FIG. 8(c), the antenna ports may be first indexed with respect to the horizontal direction, then indexed with respect to the polarization direction and further indexed with respect to the vertical direction. Similarly, although not be shown, the antenna ports may be first indexed with respect to the horizontal direction, then indexed with respect to the vertical direction and further indexed with respect to the polarization direction. Also, the antenna ports may be indexed with respect to the horizontal direction, the vertical direction and the polarization direction independently.

In one embodiment, the antenna management unit 120 may further have reference signal configuration information indicative of a signaling pattern of reference signals transmitted from antenna ports of the antennas 110. The signaling pattern specifies from which of the antenna ports in the antennas 110 the reference signals are transmitted. As described in conjunction with FIGS. 4 and 5, the reference signals used by the user equipment 200 to measure channel states with the respective antenna ports are transmitted from the base station 100 in a predetermined signaling pattern. In order to indicate the signaling pattern to the user equipment 200, the antenna management unit 120 may have the antenna configuration information as well as the reference signal configuration information.

In one embodiment, the reference signal configuration information may indicate a sampling factor, an offset and a polarization type for the signaling pattern in respective dimensions of the antennas 110. For example, the reference signal configuration information may indicate sampling factors (H_sf, V_sf) and offsets (H_of, V_of) with respect to the horizontal direction and vertical direction, respectively. Specifically, the sampling factor may indicate a sampling interval in each dimension, and the offset may indicate a sampling start position from an original point in each dimension.

Also, if the antennas 110 are orthogonal polarization antennas, the reference signal configuration information may have a cross polarization index (CPI). The cross polarization index may be formed to indicate 00 if the reference signals are transmitted with dual polarization in the horizontal direction, 01 if the reference signals are transmitted with dual polarization in the vertical direction, 10 if the reference signals are transmitted with single polarization, and 11 may be assigned for reservation. Also, if sampling is conducted with respect to the polarization direction, the reference signal configuration information may have a sampling factor with respect to the polarization direction (P_sf).

Figure 9:
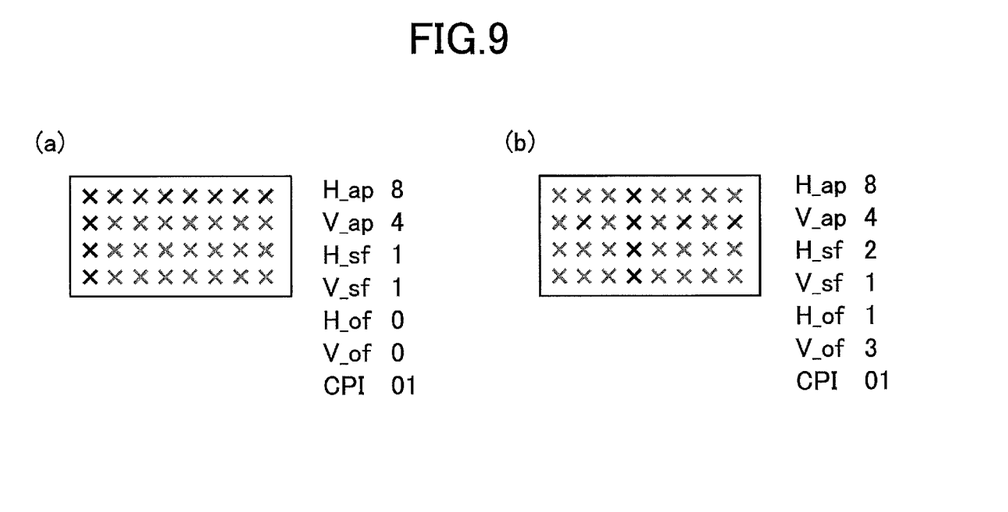
FIG. 9 is a diagram for illustrating an example of transmission patterns of reference signals according to one embodiment of the present invention.

FIG. 9 is a diagram for illustrating examples of transmission patterns of reference signals according to one embodiment of the present invention. In the illustrated examples, the transmission patterns of reference signals from 32 antenna ports composed of eight antenna ports in the horizontal direction (H_ap=8) and four antenna ports in the vertical direction (V_ap=4) are illustrated.

The transmission pattern as illustrated in FIG. 9(a) is defined with the reference signal configuration information of H_sf=1, V_sf=1, H_of=0, V_of=0 and CPI=01. For the horizontal direction, since H_sf=1 and H_of=0, the reference signals are transmitted from all antenna ports arranged in the first row with respect to the horizontal direction. Also, for the vertical direction, since V_sf=1 and V_of=0, the reference signals are transmitted from all antenna ports arranged in the first row with respect to the vertical direction. Also, since CPI=0 for the polarization type, the reference signals are transmitted with dual polarization with respect to the vertical direction.

Also, the transmission pattern as illustrated in FIG. 9(b) is defined with the reference signal configuration information of H_sf=2, V_sf=1, H_of=1, V_of=3 and CPI=01. For the horizontal direction, since H_sf=2 and H_of=1, the reference signals are transmitted from half of antenna ports arranged in the second row with respect to the horizontal direction. Also, for the vertical direction, since V_sf=1 and V_of=3, the reference signals are transmitted from all antenna ports arranged in the fourth column with respect to the vertical direction. Also, since CPI=01 for the polarization type, the reference signals are transmitted with dual polarization with respect to the vertical direction.

The transmission and reception unit 130 transmits and receives radio signals to/from the user equipment 200 via the antennas 110 and transmits the antenna configuration information to the user equipment 200. As stated above, the antenna configuration information indicates an arrangement of the antennas 110 and may indicate the number of antenna ports in each dimension of the antennas 110 and the polarization types of the antennas 110.

In one embodiment, the transmission and reception unit 130 may transmit a combination of respective parameters indicative of the number of antenna ports in the respective dimensions and the polarization types to the user equipment 200. For example, the transmission and reception unit 130 may transmit a combination of the number of horizontal antenna ports (H_ap) and the polarization type (P_ap) as joint information to the user equipment 200 and transmit the number of vertical antenna ports (V_ap) as additional information to the user equipment 200. Such transmission of parameters enables backward compatibility with previous releases of the LTE standard to be maintained. However, the transmission and reception unit 130, but is not limited to it, may combine H_ap with V_ap and transmit P_ap as the additional information or combine V_ap with P_ap and transmit H_ap as the additional information. Note that the polarization types indicative of single polarization and dual polarization may be indicated as a flag (P_flag).

In the above-stated embodiment, the transmission and reception unit 130 transmits the antenna configuration information specifying the number of horizontal antenna ports and the number of vertical antenna ports to the user equipment 200. However, the present invention is not limited to it, and the transmission and reception unit 130 may send the user equipment 200 the antenna configuration information specifying the number of antenna ports for a first CSI feedback set and the number of antenna ports for a second CSI feedback set for feedback from the user equipment 200. Also, in the above-stated embodiment, the transmission and reception unit 130 transmits the antenna configuration information on an arrangement of antenna ports to the user equipment 200, but is not limited to it, and may transmit the antenna configuration information regarding information indicative of an arrangement of antenna ports, an arrangement of antenna elements, an arrangement of TXRUs, an arrangement of subarrays or a combination thereof to the user equipment 200, for example.

In one embodiment, the transmission and reception unit 130 may indicate the antenna configuration information in PBCH (Physical Broadcast Channel) or RRC (Radio Resource Control) signaling or a combination thereof. For example, the total number of antenna ports may be indicated in the PBCH, and more detailed antenna configuration may be indicated based on the PBCH information. Here, the transmission and reception unit 130 may indicate the antenna configuration information in the RRC signaling by including it in a CSI process defined in Release 11 of the LTE standard. The CSI process includes CSI-RS resource configuration and CSI-IM (CSI-Interference Measurement) resource configuration, and the user equipment 200 measures a channel state for each of the CSI processes indicated from the base station 100 and generates the CSI based on the measured channel states. Here, the user equipment 200 calculates power necessary to perform the 3D MIMO communication based on the CSI-RS resource configuration and calculates interference power from other beams in the 3D MIMO communication based on the CSI-IM resource configuration. At this time, multiple CSI-RS resources may be included in one CSI process. Also, the antenna configuration information may be included in the CSI-RS resources. Furthermore, the multiple CSI processes (or the CSI-RS resource configuration) may be included by using an upper concept from the CSI process.

Also, in downlink CoMP of Rel. 11, the multiple CSI processes can be used to estimate CSIs for cells of up to eight antennas that are remotely disposed geographically. In the 3D MIMO, for a base station having more than 8 antennas, more than eight CSIs can be estimated by configuring multiple CSI processes. In the CoMP, the CSI estimation for geographically remote cells is basically assumed, but in the 3D MIMO, information indicating whether the multiple CSI processes and/or the CSI-RS resource configuration are geographically remote or the same may be included.

For example, colocation information may be included in the CSI-RS resource configuration. Furthermore, the multiple CSI processes may signal physical relationship of the CSI-RS resource configuration.

In one embodiment, the transmission and reception unit 130 may further transmit the reference signal configuration to the user equipment 200. Specifically, the transmission and reception unit 130 may transmit the reference signal configuration information indicative of a signaling pattern of reference signals transmitted from antenna ports of the antennas together with the antenna configuration information to the user equipment 200.

As stated above, the reference signal configuration information indicates sampling factors, offset and polarization types for signaling patterns in respective dimensions of the antennas 110, for example, but is not limited to it, and may include any other appropriate parameters indicative of from which of the antenna ports in the antennas 110 the reference signals are transmitted with which of the polarization types. For example, the number of reference signals and a sampling factor for each dimension may be indicated.

Also, for convenience of description, the antenna configuration information and the reference signal configuration information have been described as different information elements, but the present invention is not limited to it. Parameters of the antenna configuration information and parameters of the reference signal configuration information may be indicated as a single information element to the user equipment 200. A codebook or a maximum rank can be selected based on the above-stated parameters.

Also, in one embodiment, the transmission and reception unit 130 may further indicate parameters related to the CSI-RS resource configuration. The CSI-RS resource configuration related parameters may include a CSI-RS resource configuration identity, the number of CSI-RS ports, CSI RS configuration, CSI RS subframe configuration, assumption of the user equipment 200 for PDSCH transmission power at calculation of CSI feedback information, a pseudo random number sequence generation parameter and various colocation information in cases where transmission mode 10 is configured for the user equipment 200. The transmission and reception unit 130 may indicate these parameters by including multiple elements in the single CSI-RS resource configuration or by including multiple CSI-RS resource configurations in the single CSI configuration.

Note that the CSI-RS resource configuration identity is an index of the CSI-RS resource configuration. The number of CSI-RS ports is the number of transmission antenna ports of the CSI-RS (2, 4 or 8 or the like). The CSI-RS configuration indicates a multiplexing position (a subcarrier number and/or a symbol number) of a CSI-RS in a subframe. The CSI-RS subframe configuration CST-RS indicates a temporal multiplexing position of a CSI-RS (transmission cycle and/or an offset). The PDSCH transmission power $P_C$ at calculation of the CSI feedback information indicates a power ratio between the CSI-RS and the PDSCH. The pseudo random number sequence generation parameter $n_{ID}$ is a parameter for generating a CSI-RS sequence. An upper layer parameter qcl-CRS-Info-r11 is information for indicating with which CRS the CSI-RS is collocated. Since the CSI-RS is very sparse, frequency synchronization cannot be achieved alone, and the frequency synchronization is performed with the CRS. To this end, it is necessary to indicate which of CRSs is used for the CSI-RS.

Figure 10:
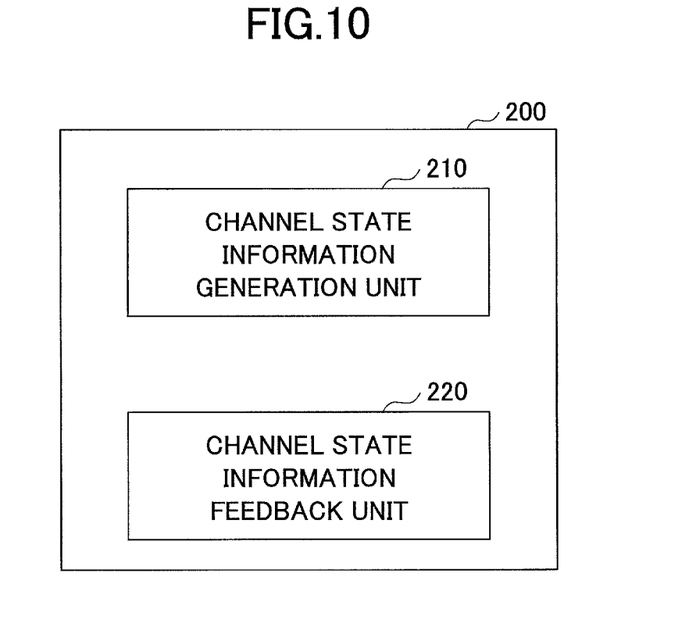
FIG. 10 is a block diagram for illustrating an arrangement of user equipment according to one embodiment of the present invention.

Next, the user equipment according to one embodiment of the present invention is described. FIG. 10 is a block diagram for illustrating an arrangement of the user equipment according to one embodiment of the present invention.

As illustrated in FIG. 10, the user equipment 200 has a channel state information generation unit 210 and a channel state information feedback unit 220.

The channel state information generation unit 210 measures channel states of antenna ports of 3D MIMO antennas 110 in the base station 100 with reference signals transmitted from the antenna ports and generates channel state information based on the measured channel states. Specifically, the channel state information generation unit 210 receives reference signals (CSI-RSs) transmitted from antenna ports in the base station 100 and not only measures channel states with the transmitting antenna ports based on the received reference signals but also estimates the channel states with the antenna ports not transmitting the reference signals based on the measured channel states. Then, the channel state information generation unit 210 calculates a rank indicator (RI), a CQI (Channel Quality Indicator) and a precoding matrix indicator (PMI) for use in the 3D MIMO communication based on the estimated channel states and feeds them as the channel state information (CSI) back to the base station 100.

In one embodiment, the channel state information generation unit 210 may receive antenna configuration information indicative of an arrangement of the antennas 110 in the base station 100 and reference signal configuration information indicative of a signaling pattern of reference signals transmitted from antenna ports of the antennas 110 from the base station 100 and measure channel states of antenna ports based on the received antenna configuration information and reference signal configuration information. By using the antenna configuration information and the reference signal configuration information, the channel state information generation unit 210 can estimate the channel states with the antenna ports not transmitting the reference signals with high accuracy based on the channel states measured for the antenna ports transmitting the reference signals.

Also, the channel state information generation unit 210 may generate the channel state information based on multiple CSI resources. The PMI for the 3D MIMO may be fed back based on two different CSI processes. Similarly, the RI and the CQI may be fed back based on the multiple CSI processes.

Figure 11:
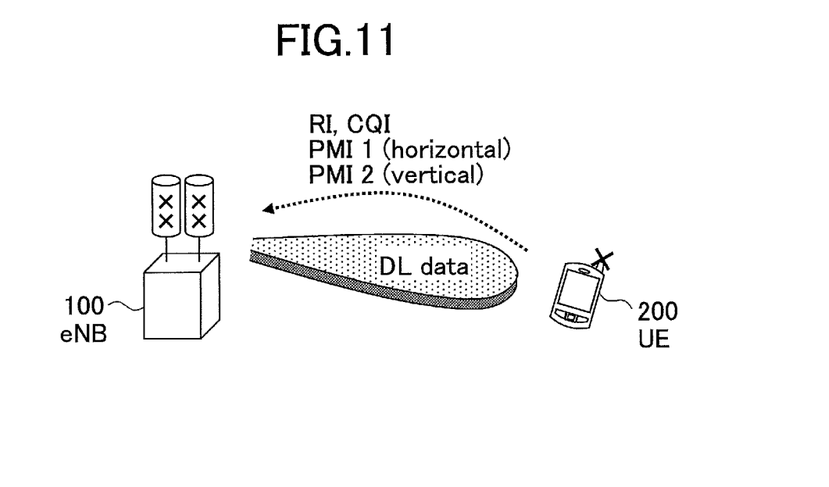
FIG. 11 is a diagram for illustrating exemplary CSI feedback according to one embodiment of the present invention.

The channel state information feedback unit 220 uses different channel state information feedback means for antenna ports in respective dimensions of the antennas 110 to feed the generated channel state information back to the base station 100. Specifically, as stated above, the base station 100 transmits the reference signals from the antenna ports in the horizontal direction and the vertical direction to the user equipment 200. To this end, as illustrated in FIG. 11, the channel state information feedback unit 220 also feeds horizontal PMI 1 and vertical PMI 2 back to the base station 100 corresponding to the reference signals received from horizontal and vertical antenna ports, respectively.

Figure 12:
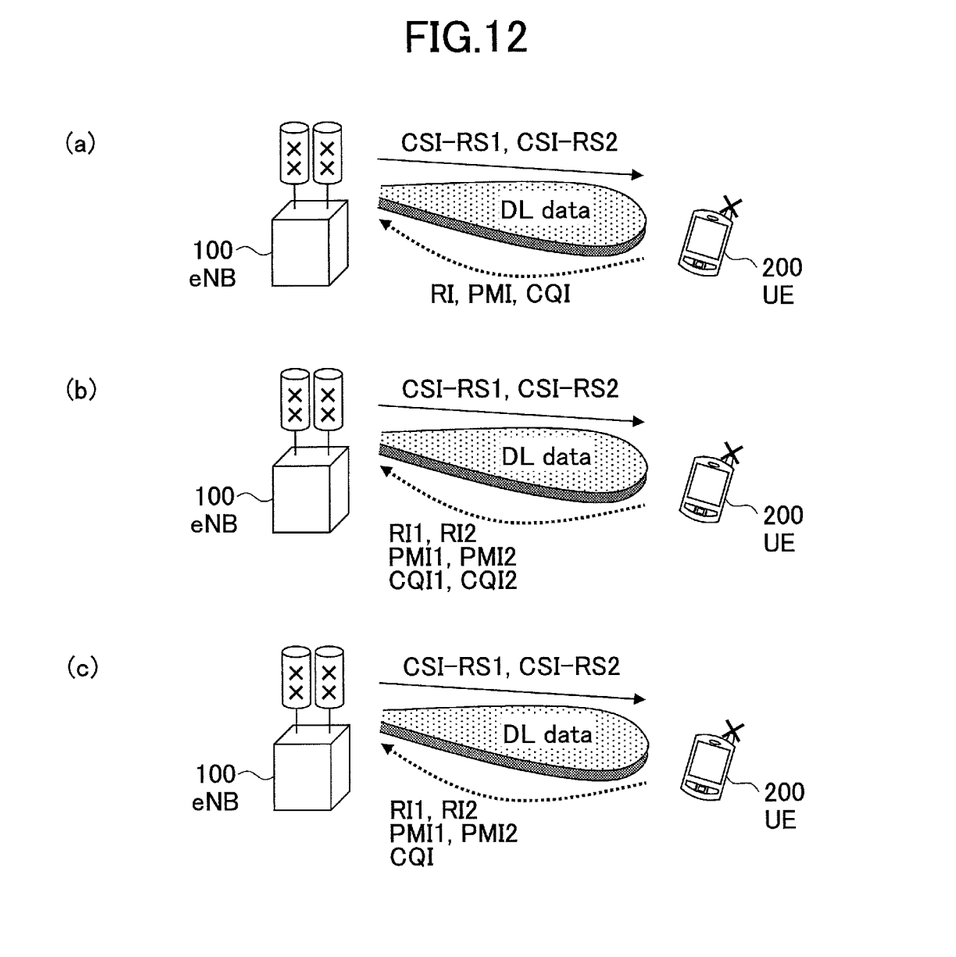
FIG. 12 is a diagram for illustrating another CSI feedback according to one embodiment of the present invention.

Also, in other embodiments, as illustrated in FIG. 12, the channel state information feedback unit 220 may feed back the channel state information of the RI, the PMI and the CQI for CSI-RS 1 and CSI-RS 2 in various manners. For example, as illustrated in FIG. 12(*a*), the channel state information feedback unit 220 may feed the RI, the PMI and the CQI estimated for CSI-RS 1 and CSI-RS 2 as joint information back to the base station 100. Also, as illustrated in FIG. 12(*b*), the channel state information feedback unit 220 may feed RI 2, PMI 1 and CQI 1 estimated for CSI-RS 1 and RI 2, PMI 2 and CQI 2 estimated for CSI-RS 2 separately back to the base station 100 with different channel state information feedback means. Similarly, as illustrated in FIG. 12(*c*), the channel state information feedback unit 220 may RI 1 and PMI 1 estimated for CSI-RS 1 and RI 2 and PMI 2 estimated for CSI-RS 2 separately back to the base station 100 with different channel state information feedback means and feed the CQI as the joint information back to the base station 100.

In one embodiment, the channel state information feedback unit 220 may use first channel state information feedback means for horizontal antenna ports of the antennas 110 to feed the generated channel state information back to the base station 100 and second channel state information feedback means for vertical antenna ports of the antennas 110 to feed the generated channel state information back to the base station 100, and the first channel state information feedback means may be able to implement finer precoding than the second channel state information feedback means. In general, in the 3D MIMO, it is not suitable to multiplex multiple data streams in the vertical direction, and it is mainly assumed to control beams only in the vertical direction whereas it is considered that finer beam control is effective for the horizontal direction. In order to reduce a signaling amount for feedback, the channel state information feedback unity 220 may use two types of channel state information feedback means having different granularities to feed the horizontal PMI 1 and the vertical PMI 2 back to the base station 100.

For example, the first channel state information feedback means may be a 4-Tx codebook of LTE standard Release 12, and the second channel state information feedback means may be a DFT (Discrete Fourier Transform) codebook. The DFT codebook is simpler than the 4-Tx codebook of the LTE standard Release 12 and is preferable to implement the vertical beam control. Also, the first channel state information feedback means may be the 4-Tx codebook of the LTE standard Release 12, and the second channel state information feedback means may be a beam index in beam selection instead of the PMI or feedback information in cases for beam tracking. In other words, the channel state information feedback unit 220 may select an optimal beam from beams transmitted from respective antenna ports in the base station 100 and indicate a beam index of the selected beam as the second channel state information feedback means back to the base station 100. More generally, upon receiving a CSI-RS process from the base station 100, the channel state information feedback unit 220 may indicate the beam index for beam tracking for the first CSI-RS process and the selected PMI for the second CSI-RS process.

Also, the channel state information feedback unit 220 may configure the channel state information feedback means for each CSI feedback unit, for example, configure the channel state information feedback means for code books or the like for each CSI process.

Figure 13:
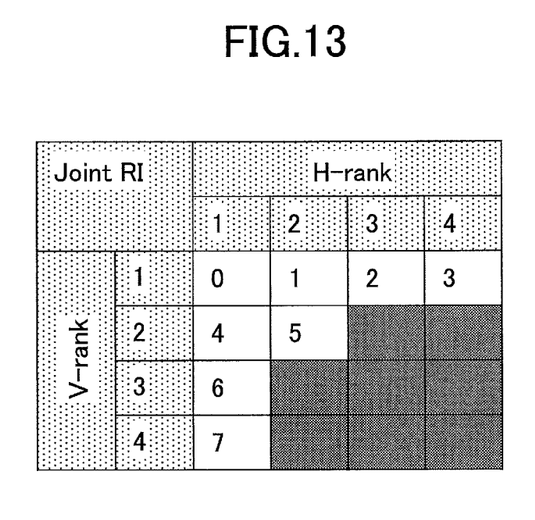
FIG. 13 is a diagram for illustrating combinations of rank indicators according to one embodiment of the present invention.

Also, the channel state information feedback unit 220 may feed a combination of rank indicators for respective dimensions of the antennas 110 back to the base station 100. Specifically, the channel state information feedback unit 220 may indicate the respective channel state information for the horizontal direction and the vertical direction as joint information back to the base station 100. Then, the selected horizontal PMI would be dependent on the selected vertical PMI. For example, for the rank indicator, multiple RIs such as the first RI for the first PMI and the second RI for the second PMI may be fed back. For example, if the user equipment 200 has four reception antennas, the maximum rank is limited to 4. Then, the channel state information feedback unit 220 may combine the horizontal rank with the vertical rank and feed a combination of the rank indicators back to the base station 100 as illustrated in FIG. 13. Note that the scheme for indicating the combined ranks for rank 4 has been described in this example, but the ranks combined around multiple ranks (for example, ranks 1 to 8) may be additionally indicated. Since it is assumed that the vertical beam control is indicated with relatively simpler channel state information feedback means, a combination for relatively higher (or multi-rank) vertical rank indicators may not be included. In other words, it may be effective that the rank indicators are associated with only the horizontal CSIs (or included in the horizontal CSI feedbacks).

Also, for the PMI, multiple PMIs such as a first PMI for the horizontal direction and the polarization type and a second PMI for the vertical direction may be fed back. The user equipment 200 may use the latest RI and the first PMI to select the second PMI and/or use the latest RI and the second PMI to select the first PMI. To this end, the base station 100 may indicate the latest RI and the first PMI to the user equipment 200 to select the second PMI and the latest RI and the second PMI to the user equipment 200 to select the first PMI.

Also, for the CQI, the CQI may be selected for each CQI process. Also, one CQI may be selected based on two different CSI processes.

Although the embodiments of the present invention have been described in detail, the present invention is not limited to the above-stated specific embodiments, and various modifications and variations can be made within the spirit of the present invention as recited in claims.

This international patent application claims benefit of priority based on Japanese Priority Application No. 2014-195882 filed on Sep. 25, 2014, the entire contents of which are hereby incorporated by reference.

LIST OF REFERENCE SYMBOLS

10: radio communication system
100: base station
200: user equipment

The invention claimed is:

1. A base station, comprising:
   antenna ports; and
   a transmitter and a receiver configured to transmit and receive radio signals to/from a user equipment via the antenna ports,
   wherein the transmitter transmits, to the user equipment, an information element indicating
      antenna configuration information indicative of a two-dimensional arrangement of the antenna ports, and
      information related to a sampling factor indicating a sampling interval in each dimension of the antenna ports,
   wherein the transmitter transmits, to the user equipment, reference signal configuration information indicative of a signaling pattern of reference signals transmitted from the antenna ports.

2. The base station as claimed in claim 1, wherein the transmitter transmits the antenna configuration information in Radio Resource Control (RRC) signaling.

3. A user equipment comprising:
   a processor configured to receive an information element indicating
   antenna configuration information indicative of a two-dimensional arrangement of antenna ports in a base station, and
   information related to a sampling factor indicating a sampling interval in each dimension of the antenna ports,
   wherein the processor is further configured to:
      receive reference signal configuration information indicative of a signaling pattern of reference signals transmitted from the antenna ports,
      measure channel states of the antenna ports with the reference signals transmitted from the antenna ports and generate channel state information based on the received antenna configuration information, and
      use different codebooks for the antenna ports to feed the generated channel state information back to the base station.

* * * * *